United States Patent
Aronson et al.

(10) Patent No.: US 7,178,995 B2
(45) Date of Patent: Feb. 20, 2007

(54) METHOD AND APPARATUS FOR REDUCING REFLECTANCE IN AN OPTICAL MOUNT USING A GLASS SPACER

(75) Inventors: Lew Aronson, Los Altos, CA (US); Jignesh Shah, Sunnyvale, CA (US); Paul Rosenberg, Sunnyvale, CA (US); Ramesh Sundaram, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 26 days.

(21) Appl. No.: 10/429,899

(22) Filed: May 5, 2003

(65) Prior Publication Data

US 2004/0086233 A1    May 6, 2004

Related U.S. Application Data

(60) Provisional application No. 60/422,675, filed on Oct. 31, 2002.

(51) Int. Cl.
*G02B 6/36* (2006.01)

(52) U.S. Cl. .......................... 385/92; 385/87

(58) Field of Classification Search ............ 385/80, 385/87, 92
See application file for complete search history.

(56) References Cited

U.S. PATENT DOCUMENTS

| | | | | |
|---|---|---|---|---|
| 5,058,984 A | * | 10/1991 | Bulman et al. | 385/80 |
| 5,737,465 A | * | 4/1998 | Okochi | 385/88 |
| 6,661,951 B1 | * | 12/2003 | Blair et al. | 385/33 |
| 2002/0164130 A1 | * | 11/2002 | Elkins et al. | 385/87 |
| 2003/0091304 A1 | * | 5/2003 | Tonai et al. | 385/93 |

* cited by examiner

*Primary Examiner*—Sung Pak
*Assistant Examiner*—Tina M. Wong
(74) *Attorney, Agent, or Firm*—Workman Nydegger

(57) ABSTRACT

Embodiments of the invention generally provide an optical component configured to minimize reflectance. The component generally includes an optical housing having a bore formed therethrough, the bore having a central component receiving portion, and a glass block positioned in the component receiving portion in abutment with a fiber receiving bore. The component further includes a fuzzy mount secured in the central component receiving portion, the fuzzy mount being secured via a plurality of extending teeth formed on an outer surface thereof, the teeth being configured to engage an inner surface of the central component receiving portion to secure the fuzzy mount therein.

25 Claims, 4 Drawing Sheets

METHOD AND APPARATUS FOR REDUCING REFLECTANCE IN AN OPTICAL MOUNT USING A GLASS SPACER

CROSS-REFERENCE TO RELATED APPLICATIONS

This application claims benefit of U.S. provisional patent application serial No. 60/422,675, filed Oct. 31, 2002, which is herein incorporated by reference.

BACKGROUND OF THE INVENTION

1. Field of the Invention

Embodiments of the invention generally relate to an apparatus and method for reducing reflection characteristics in optical components. More particularly, embodiments of the invention relate to using a glass spacer in an optical component to minimize reflectance back into an optical fiber or source.

2. Description of the Related Art

One challenge associated with optical signal transmission technology, and in particular, with interconnecting various optical signal transmission components, is that the interconnection between components inherently results in a percentage of the optical signal transmitted therethrough being reflected either back in the direction from which it was originally transmitted or in another direction that does not correspond to the desired transmission direction. Regardless of the reflection direction, the percentage of the optical signal that is reflected is no longer transmitted, and therefore, at a minimum the signal strength is reduced, or more importantly, portions of the data stream may be lost. Therefore, it is desirable to design optical interconnections having a minimal amount of reflectance, wherein reflectance is generally defined as the ratio of the reflected power to incident power, which is generally expressed in dB or a percentage of the total optical signal power. Further, since reflection loss is generally defined as a discontinuity or impedance mismatch between the ratio of the incident power to the reflected power, reflection loss (Lr) may be represented by the following equation, $$L_r = 20 \log_{10} \left| \frac{Z_1 - Z_2}{Z_1 + Z_2} \right| = 10 \log_{10} \frac{(Z_1 - Z_2)^2}{(Z_1 + Z_2)^2},$$

wherein Z 1 and Z 2 are the respective impedances of the two optical devices or components being connected together, and the vertical bars designate absolute magnitude. Furthermore, it is generally known that in an optical fiber, a loss takes place at any discontinuity in the refractive index between the optical signal transmission mediums, especially at an air-glass interface, such as a fiber endface, at which a fraction of the optical signal is reflected back toward the source. It is to be noted that this reflection loss is also called a Fresnel reflection loss or simply Fresnel loss. In accordance with the Fresnel principles, at normal incidence, the fraction of reflected power may be expressed by the formula, $$L_f = 10 \log_{10} \frac{(n_1 - n_2)^2}{(n_1 + n_2)^2},$$

where n 1 and n 2 are the respective indices of refraction.

Inasmuch as the reflectance is known to interfere with efficient signal transmission, it is desirable to minimize and/or eliminate reflectance characteristics.

SUMMARY OF THE INVENTION

Embodiments of the invention generally provide optical components capable of reducing reflection loss. More particularly, embodiments of the invention generally provide TOSA and ROSA assemblies that include a glass block device positioned within the assembly, wherein the glass block is positioned, sized, and configured to reduce or minimize the reflection loss of an optical signal being received from an optical fiber in optical communication with the TOSA or ROSA. Further, embodiments of the invention utilize an improved assembly process, wherein the assembly process includes press fitting operations. The press fitting operations are generally configured to secure components within an optical housing without the use of epoxy, which eliminates epoxy breakaway during thermal cycling.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the present invention generally provide an optical body configured to receive an optical fiber and transmit the optical signal emitted from the fiber to a component in communication with the body, i.e., a photo diode, for example. The body is constructed with components that are press fitted together in a manner that is generally configured to reduce reflection of the optical signal emitted from the fiber back into the fiber. In one embodiment of the invention a fuzzy mount device is pressed into the inner diameter of 'the optical housing with a glass block positioned below the fuzzy mount, i.e., the glass block is positioned such that the press fitting of the fuzzy mount causes the glass block to be secured into the housing via the fuzzy mount. The glass block is generally sized (thickness) to dissipate the Gaussian distribution of the optical signal that may be reflected, i.e., essentially flattening the Gaussian distribution so that less of the distribution curve is available to re-enter the source fiber.

In another embodiment of the invention the glass block is positioned in the optical housing and then the fuzzy mount is pressed in over the glass in an inverted manner, thus securing the glass in the mount. The use of the glass block has shown to reduce reflectance from approximately 60 dB without the block to as low as 12 dB with the block. Additionally, the pressing of the fuzzy mount into the housing eliminates epoxy processes, and therefore, decreases the difficulty of assembly as well as the assembly time required. Further, the elimination of epoxy in the manufacturing processes eliminates the thermal cycling epoxy breakaway problems that may be encountered with epoxy affixation methods.

Embodiments of the invention may further provide a three-piece optical body configured to support a fiber stub therein. Conventional devices utilize a 4 piece assembly, and therefore, the invention saves on cost and assembly time via elimination of a mounting part without reducing the mounting efficiency of effectiveness. An exemplary embodiment of the invention includes a housing, a split sleeve that is pressed into the housing, and a fiber stub that is pressed into the split sleeve prior to the sleeve being pressed into the housing. Although fiber stubs are generally known in the optical art, the use of a fiber stub pressed into the split sleeve that is press fitted or fuzzy mounted into a housing is an improvement over conventional devices, as conventional devices used the stub, ferrule, sleeve and a housing. The fuzzy mounting system is also used in place of conventional epoxy processes. The end result is that reflectance is improved as a result of the stub and process time and cost is decreased as a result of fewer required parts. Further, inasmuch as epoxy bonding is eliminated, breakaway problems associated with epoxy being exposed to thermal cycling are also eliminated.

Figure 1:
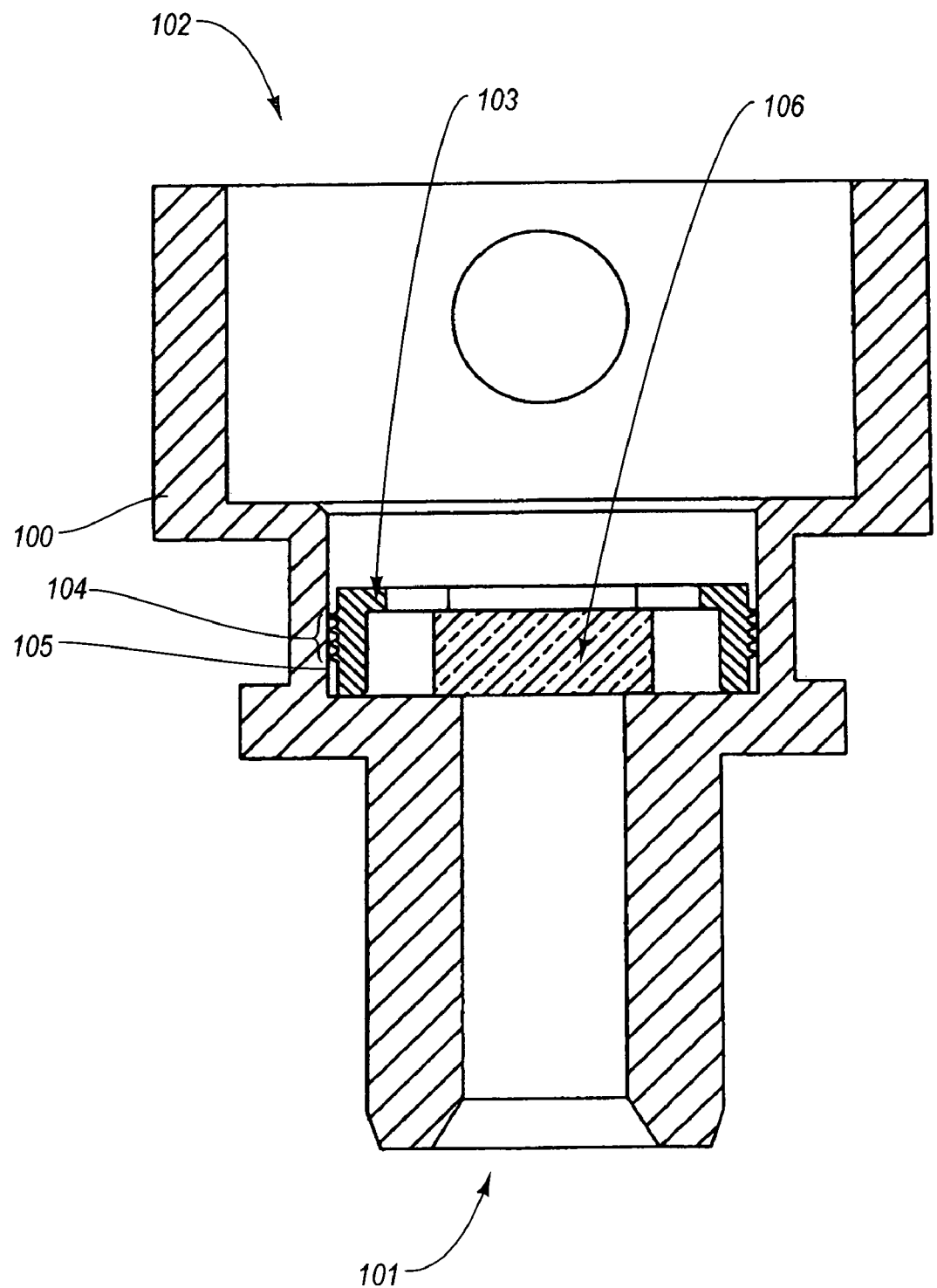
FIG. 1 illustrates a sectional view of an exemplary optical housing of the invention that utilizes a press fitted glass block for reflection prevention.

Embodiments of the invention may generally provide a nose body having a circular longitudinal channel formed therethrough. The channel includes a distal ledge positioned proximate a fiber receiving end of the body. The interior of the channel proximate the device end of the body includes a plurality of deformable teeth configured to deflect or deform at a predetermined force, and as such, the teeth may be used to secure a circular part therein using a predetermined securing force. A cylindrical split sleeve having a fiber stop or a fiber stub secured therein is press fitted into the channel to a position proximate the ledge. The teeth extending from the inner diameter if the channel deform as the sleeve is pressed therein and operate to secure the sleeve in the channel. Additionally, the channel may include an annular trash bump positioned between the teeth and the ledge, which may operate to prevent any particles broken off during the press process from traveling down the channel and entering into the fiber receiving area FIG. 1 illustrates a sectional view of an exemplary optical housing of the invention that utilizes a press fitted glass block for reflection prevention. The optical housing 100 generally includes a fiber receiving end 101 and a component receiving end 102, wherein the component may be any optical component, such as a transmitter or receiver. The interior of the optical housing 100 generally includes three inner diameters. A first inner diameter is generally adjacent fiber receiving end 101, and the inner diameter generally corresponds to the outer diameter of a fiber to be received therein. A second inner diameter is generally positioned adjacent the component receiving end 102 and maybe sized to receive various optical components therein. A third inner diameter is generally positioned between the component receiving end 102 and the fiber receiving end 101, and is generally sized to be of a diameter that is greater than the first inner diameter and less than the second inner diameter. Additionally, the second inner diameter generally includes a surface 105 configured to mechanically engage a component that is press fitted therein, as will be further discussed herein.

The third inner diameter generally defines a volume within the optical housing 100, wherein the volume is configured to receive optical components that are to be positioned between the terminating end of a fiber and an optical component, both of which are received in their respective ends of housing 100. In the present exemplary embodiment, the optical components received within the volume defined by the third inner diameter generally include a mounting cup 103 (generally termed a fuzzy mount) configured to secure a glass block 106 at a position adjacent to the terminating end of the fiber received in the optical housing 100. More particularly, mounting cup 103 generally includes an annular base member having a conical wall extending therefrom around the perimeter of the annular base member. Further, the outer diameter of the conical wall generally includes a plurality of substantially rigid teeth 104 extending therefrom. The inner diameter of the conical wall (of mounting cup 103) is generally sized to receive glass block 106 therein. Additionally, in order to allow for an optical signal to be transmitted therethrough, the annular base member generally includes an aperture centrally formed therein, which allows for the optical signal received from the fiber to travel through glass block 106 and through the aperture in mounting cup 103, and thereafter be received by an optical component mounted in component receiving end 102 (assuming a receiver configuration is being illustrated—the optical signal direction would be opposite if a transmitter configuration were being illustrated, and therefore, the optical signal would travel from the transmitter, through the aperture, through the glass block, and be received in the terminating end of the fiber). The teeth 104 positioned on the outer diameter of the mounting cup 103 are generally configured to deform at a predetermined pressure, and therefore, the teeth are manufactured to deform when the mounting cup is pressed into the third inner diameter. Further, the deformation of teeth 104 operates to both secure the mounting cup 103 therein, as well as to prevent excessive stress generated during the press fitting process from damaging, stressing, or otherwise cracking the components of the housing or cup. The surface 105 of the third inner diameter is generally configured to engage teeth 104 when mounting cup 103 is pressed therein. For example, surface 105 may be ridged, scalloped, stepped, roughed, textured, or otherwise configured such that surface 105 frictionally engages teeth 104 when cup 103 is pressed therein.

Glass block 106 is generally configured to prevent an optical signal received from an optical fiber secured within housing 100 from reflecting back into the optical fiber from which the signal was received. More particularly, glass block 106 is generally configured to dissipate or spread out the Gaussian distribution of the reflected portion of the optical signal such that the amount of the optical signal reflected back into the optical fiber is minimized. For example, the thickness of glass block 106 may be calculated such that the optical signal traveling linearly therethrough is primarily transmitted directly through the block, and therefore, is received through the aperture formed in mounting cup 103, and therefore, by the receiver positioned in housing and 102. However, the calculated thickness of glass block 106 may further be configured to increase the angle of reflection of the portion of the optical signal that is reflected at the interface between the glass block 106 and downstream components. This increased angle of reflection causes the optical path of the reflected portion of the optical signal to be outside of the fiber opening. Since the optical path of the reflected portion of the optical signal is outside of the fiber opening, the reflected portion of the optical signal is not received back into the optical fiber, and therefore, reflection challenges are minimized.

Figure 2:
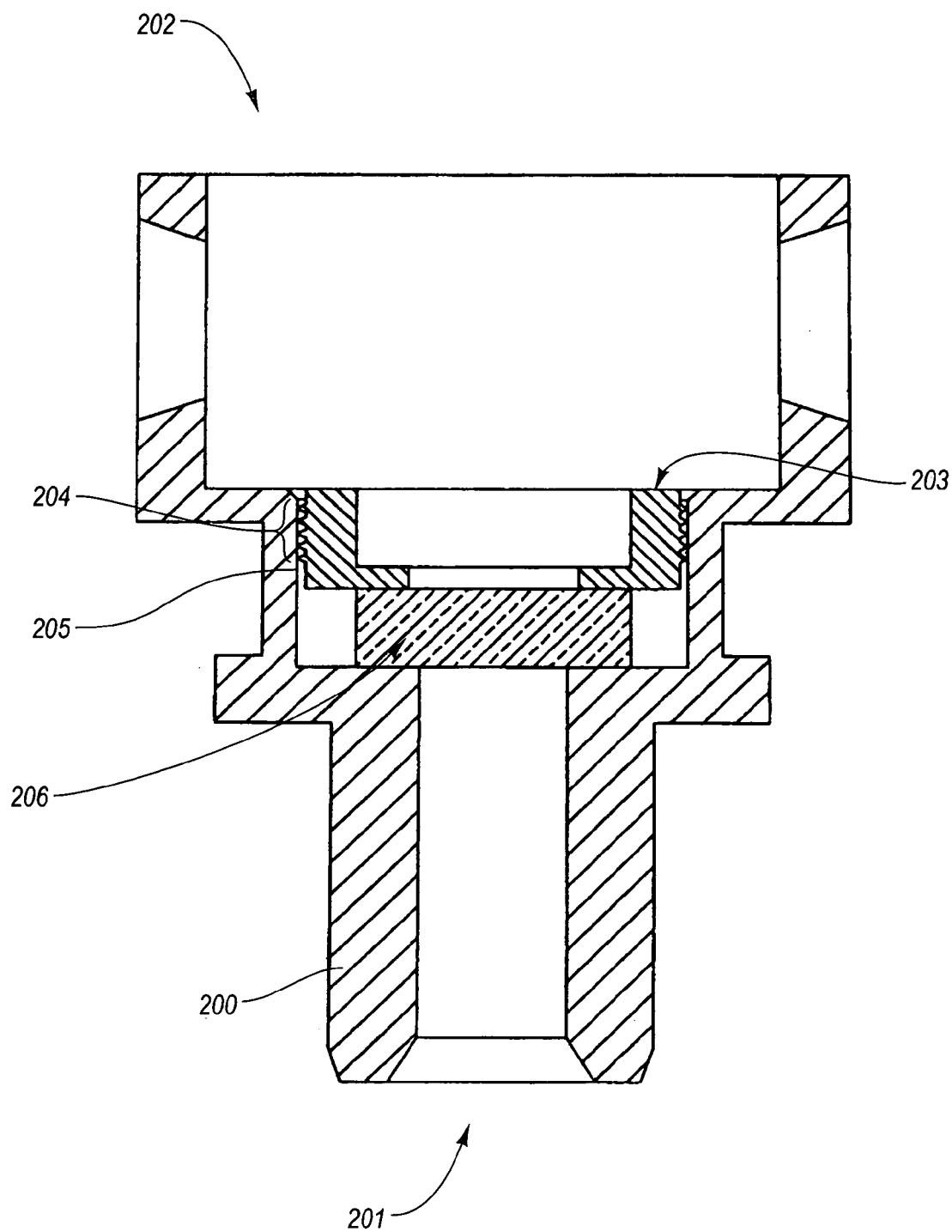
FIG. 2 illustrates a sectional view of another exemplary optical housing of the invention that utilizes a press fitted glass block for reflection prevention.

FIG. 2 illustrates a sectional view of another exemplary optical housing of the invention that utilizes a press fitted glass block for reflection prevention. However, the optical component 200 is configured to utilize a slightly different mounting configuration for the mounting cup 203 and the glass block 206. More particularly, in this embodiment of the invention of the glass block 206 is positioned within a central portion of the optical housing 200. Thereafter, mounting cup 203 is press fitted into the central or third inner diameter above glass block 206, thus securing glass block 206 into housing 200. In similar fashion into the embodiment illustrated in FIG. 1, the outer surface of mounting cup 203 generally includes a plurality of substantially rigid teeth 204 extending therefrom. Teeth 204 are configured to engage the inner surface 205 of the inner diameter of housing 200. Teeth 204 are configured to perform at a predetermined pressure, and therefore, secure the glass block 206 within optical housing 200 via engagement with the inner surface 205 after being pressed into the inner diameter. In order to increase the engagement friction between teeth 204 and inner surface 205, inner surface 205 may include a plurality of ridges, steps, or other features configured to engage teeth 204 to secure mounting cup 203 within the inner diameter.

Figure 3:
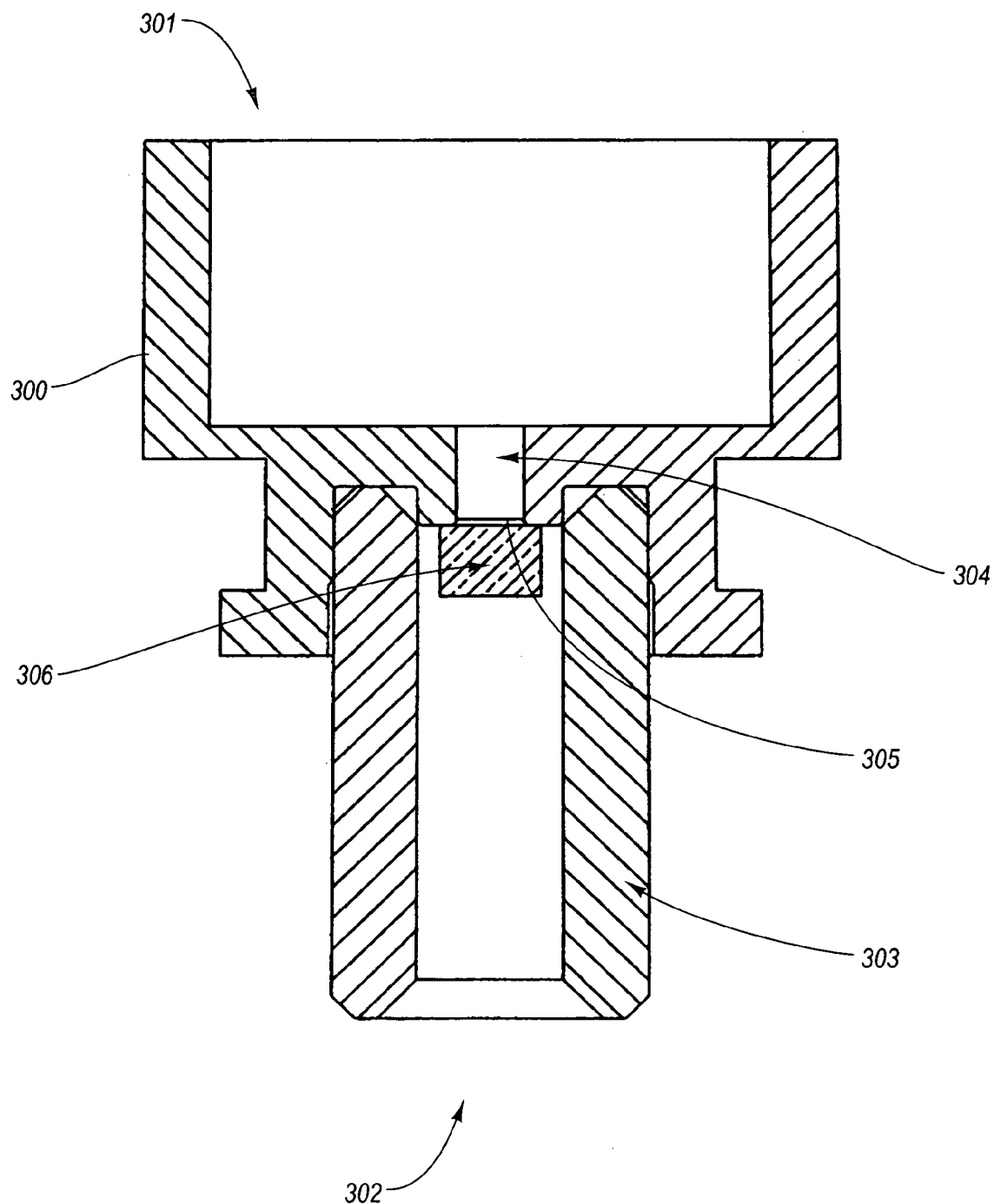
FIG. 3 illustrates a sectional view of another exemplary optical housing of the invention that utilizes a glued glass block for reflection prevention.

FIG. 3 illustrates a sectional view of another exemplary optical housing of the invention that utilizes a glued glass block for reflection prevention. In this embodiment of the optical housing 309 again includes a first receiving and 301 end and a second receiving end 302. Generally, the first receiving end 301 may be configured to contain a receiver, while the second receiving end 302 may be configured to engage a fiber. The interior portion of housing 300 generally connects the first end 301 to the second end 300 to via a central aperture 304. As such, first end 301 is an optical communication with second end 302 via aperture 304. Further, aperture 304 generally terminates in at the second end 302 and includes an annular flange or base that is exposed to second end 302. Flange 302 is configured such that a glass block 306 may be a fixed thereto, via, for example, an epoxy or gluing process. Once glass block 306 is affixed to flange 305, a fiber may be brought into optical communication with housing 300. This process generally includes pressing the fiber into a ferrule 303, and then in asserting that ferrule into the second end 302 of housing 300. Ferrule 303 is generally configured such that a fiber received therein terminates proximate the end of the ferrule, such that once the ferrule is inserted into the second end, terminating end of the fiber will not contact glass block 306. Positioning the fiber within ferrule 303 such that the terminating end of the fiber does not extend beyond the terminating end of the ferrule is important, as the configuration of the glass block 306 being epoxied to flange 305 deems that the at least a portion of glass block 306 will be received with end ferrule 303. Thus, ferrule 303 must be configured to receive glass block 306 therein, without contacting the terminating end of the fiber pressed into the opposing end of ferrule 303. Once the entire optical housing 300 is assembled, the optical signal emitted from the terminating end of the fiber held within ferrule 303 will be received by glass block 306. The majority of the optical signal will be transmitted through glass block 306, through aperture 304, and received by the optical component housed within first end 301, which may be a receiver, for example. However, as is inherent with all optical interfaces, a portion of the optical signal received from the fiber will be reflected in upon being emitted from the terminating end of the fiber. Glass block 306 operates to dissipate the distribution of the reflected portion of the optical signal, such that the reflected portion does not re-enter into the terminating end of the optical fiber and become an interference signal.

Figure 4:
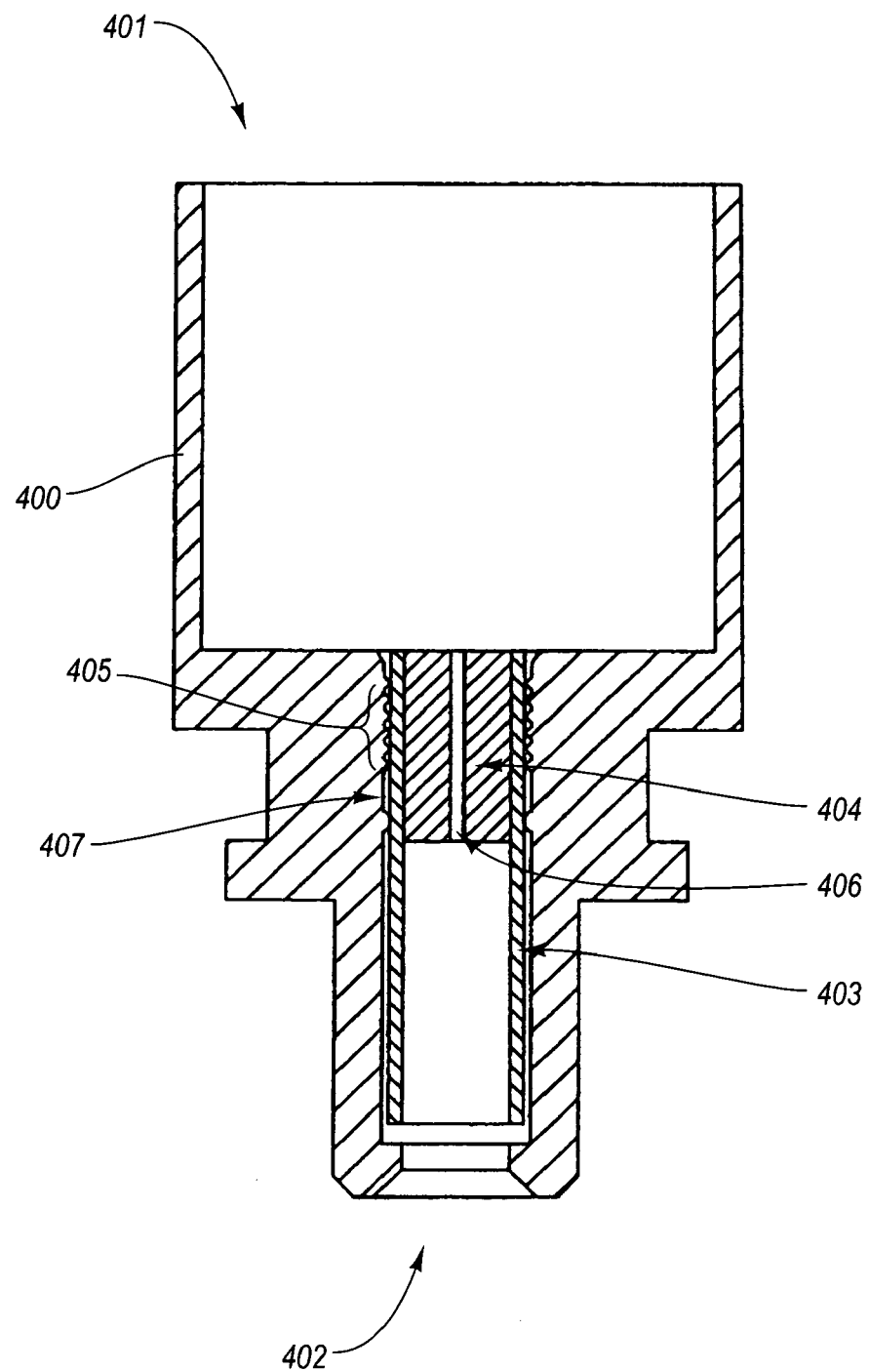
FIG. 4 illustrates a sectional view of another exemplary optical housing of the invention that utilizes a press fitted fiber stub for reflection prevention.

FIG. 4 illustrates a sectional view of another exemplary optical housing of the invention that utilizes a press fitted fiber stub for reflection prevention. In this embodiment of the invention, the reflected characteristics are reduced, but the required number of components utilized for conventional devices is also reduced. For example, optical housing 400 generally includes a first end 401 and a second end 402. First end 401 is generally configured to receive a transmitter or receiver. The second end 402 is generally configured to receive a fiber or other means of transmitting optical signal. First end 401 and second end 402 are in optical communication with each other, and more particularly, the second end 402 generally includes a circular channel formed longitudinally therethrough that interconnects the first end 401 and the second end 402. In this embodiment, a split sleeve 403 is press fitted into second end of optical housing 400. Split sleeve 403 generally includes a fiber stub 404 therein. Fiber stub 404 generally includes a longitudinal aperture 406 formed there through. Fiber stub 404 is generally press fitted into a terminating end of split sleeve 403, such that the terminating end of fiber stub 404 does not extend past the terminating end of split sleeve 403. An optical fiber is generally pressed into an opposing end of split sleeve 403. Regardless of whether the fiber stub or the optical fiber is press fitted into the split sleeve first, the end result is that the terminating end of the optical fiber is in abutment with an interior terminating end of the fiber stub 404. Thus, the optical signal emitted from the optical fiber is received in the aperture 406 of fiber stub 404 with a minimal amount of reflectance. Additionally, the inner wall of second end 402 generally includes an annular trash bump 407 positioned below teeth 405. Trash bump 407 is generally configured to prevent any particles or broken teeth components from traveling downwards along the side of housing 400 between sleeve 403 and second end 402 and coming into contact with the optical fiber or any other optical signal path. Thus, trash bump 407 is generally configured to prevent particles or broken pieces from the fuzzy mount assembly from interfering with the optical signal, if any particles are generated via the press fitting process.

While the foregoing is directed to embodiments of the present invention, other and further embodiments of the invention may be devised without departing from the basic scope thereof, and the scope thereof is determined by the claims that follow.

The invention claimed is:

1. An optical component configured to minimize reflectance, comprising:
   an optical housing having a bore formed therethrough, the bore having a central component receiving area;
   a glass block positioned in the central component receiving area in abutment with a terminating end of a fiber receiving bore; and
   an optical mounting device secured in the central component receiving area, the optical mounting device being secured via a plurality of deformable teeth extending from an outer surface thereof, the teeth engaging an inner surface of the central component receiving area to secure the optical mounting device therein, the optical mounting device applying a securing force to the glass block to secure the glass block within the central portion of the component.

2. The component of claim 1, wherein the optical mounting device is secured into the central component receiving area such that the glass block is positioned between the optical mounting device and the fiber receiving bore.

3. The component of claim 1, wherein the optical mounting device comprises an annular base portion having a hollow interior portion and a cylindrical wall extending therefrom, an outer surface of the cylindrical wall having the deformable teeth extending therefrom.

4. The component of claim 1, wherein the deformable teeth are configured to deform at a predetermined pressure to secure the optical mounting device into the component receiving area.

5. The component of claim 4, wherein the cylindrical wall has a height that is less than a thickness of the glass block and is positioned such that the cylindrical wall surrounds the glass block in the component receiving area.

6. The component of claim 4, wherein the optical mounting device is positioned in the component receiving area with the cylindrical wall extending away from the fiber receiving bore.

7. An optical component, comprising:
an optical housing having bore formed therethrough, the housing having a first end, second end, and an intermediate portion positioned between the first and second ends, the first end being configured to receive an optical device therein and the second end being configured to receive an optical fiber;
an optical mounting device positioned in the intermediate portion, the optical mounting device comprising a base having a signal transmission aperture formed therethrough and an upstanding wall circumscribing the base portion; the upstanding wall having a plurality of teeth extending from an outer surface thereof that secure the optical mounting within the intermediate portion by engaging an inner surface of the optical housing; and
a reflectance reducing block positioned between the base and the second end.

8. The optical component of claim 7, wherein the teeth are configured to engage an inner wall of the intermediate portion to secure the optical mounting device in the intermediate portion.

9. The optical component of claim 7, wherein the optical component is at least one of a TOSA and a ROSA.

10. The optical component of claim 7, wherein the mounting device is positioned in the intermediate portion such that the upstanding wall extends away from the second end.

11. The optical component of claim 7, wherein the reflectance reducing block comprises a glass block.

12. The optical component of claim 11, wherein the upstanding wall has a height that is less than a thickness of the glass block.

13. The optical component of claim 12, wherein the upstanding wall is positioned in the intermediate portion such that the upstanding wall is extending toward the second end.

14. An optical component, comprising:
a component body having a component receiving end and a fiber receiving end, the component body having a substantially hollow interior portion and a signal transmission bore longitudinally formed therethrough;
a glass block positioned across the signal transmission bore on the fiber receiving end; and
a fiber receiving ferrule releasably attached to the fiber receiving end, the fiber receiving ferrule being sized and configured to receive at least a portion of the glass block within an end of the fiber receiving ferrule.

15. The optical component of claim 14, wherein the glass block is glued at a position across the signal transmission bore.

16. The optical component of claim 14, wherein the fiber receiving ferrule comprises a split sleeve.

17. The optical component of claim 16, wherein the split sleeve is sized to be press fitted into the fiber receiving end.

18. The optical component of claim 17, wherein the glass block is sized to be received within the split sleeve.

19. A method for assembling an anti reflective optical component, comprising:
positioning an anti reflective block over a signal transmission bore longitudinally formed through optical component, the optical component including a receiving bore that receives the anti reflective block; and
securing the anti reflective block in an optical path of the signal transmission bore, the securing process comprising pressing an optical mounting device into the receiving bore of the optical component such that the anti reflective block is secured between a base of the optical mounting device and the signal transmission bore, wherein pressing comprises engaging an inner surface of the receiving bore with a plurality of deformable teeth extending from an outer surface of the optical mounting device.

20. The method of claim 19, wherein a diameter of the optical mounting device including the deformable teeth is greater than a diameter of the receiving bore before the pressing operation.

21. The method of claim 19, wherein the inner surface is a textured surface.

22. The component of claim 1, wherein the optical mounting device is substantially cup shaped and includes a conical wall that is sized to receive the glass block therein.

23. The component of claim 1, wherein the inner surface is ridged, scalloped, stepped, roughed, or textured.

24. The optical component of claim 7, wherein the inner surface is ridged, scalloped, stepped, roughed, or textured.

25. The optical component of claim 7, wherein the optical mounting device is substantially cup shaped and includes a conical wall that is sized to receive the glass block therein.

* * * * *

UNITED STATES PATENT AND TRADEMARK OFFICE
CERTIFICATE OF CORRECTION

PATENT NO. : 7,178,995 B2  
APPLICATION NO. : 10/429899  
DATED : February 20, 2007  
INVENTOR(S) : Aronson et al.

Page 1 of 1

It is certified that error appears in the above-identified patent and that said Letters Patent is hereby corrected as shown below:

Column 1  
Line 50, change "Z1 and Z2" to --$Z_1$ and $Z_2$--

Column 2  
Line 1, change "n 1 and n 2" to --$n_1$ and $n_2$--

Column 3  
Line 52, after "area", insert --.--

Column 5  
Line 18, after "fashion", change "into" to --to--  
Line 35, change "309" to --300--  
Line 45, after "Flange", change "302" to --305--

Column 8  
Line 25, change "anti reflective" to --anti-reflective--  
Line 27, change "anti reflective" to --anti-reflective--  
Line 30, change "anti reflective" to --anti-reflective--  
Lines 34-35, change "anti reflective" to --anti-reflective--

Signed and Sealed this

Twenty-third Day of September, 2008

JON W. DUDAS  
*Director of the United States Patent and Trademark Office*